(12) United States Patent
Shao

(10) Patent No.: US 10,381,928 B2
(45) Date of Patent: Aug. 13, 2019

(54) VOLTAGE REGULATOR AND METHOD FOR OPERATING A VOLTAGE REGULATOR

(71) Applicant: NXP USA, INC., Austin, TX (US)

(72) Inventor: Bin Shao, Phoenix, AZ (US)

(73) Assignee: NXP USA, INC., Austin, TX (US)

( * ) Notice: Subject to any disclaimer, the term of this patent is extended or adjusted under 35 U.S.C. 154(b) by 4 days.

(21) Appl. No.: 15/851,574

(22) Filed: Dec. 21, 2017

(65) Prior Publication Data
US 2019/0199210 A1 Jun. 27, 2019

(51) Int. Cl.
*H02M 3/158* (2006.01)
*H02M 1/08* (2006.01)
*H02M 1/00* (2006.01)

(52) U.S. Cl.
CPC ............. *H02M 3/158* (2013.01); *H02M 1/08* (2013.01); *H02M 2001/0009* (2013.01)

(58) Field of Classification Search
CPC ......... H02M 1/08; H02M 3/155–1588; H02M 2001/0009
See application file for complete search history.

(56) References Cited

U.S. PATENT DOCUMENTS

| | | | |
|---|---|---|---|
| 5,912,552 A * | 6/1999 | Tateishi | H02M 3/1588 323/224 |
| 7,019,504 B2 | 3/2006 | Pullen et al. | |
| 7,439,720 B2 | 10/2008 | Nguyen et al. | |
| 7,482,791 B2 | 1/2009 | Stoichita et al. | |
| 8,723,497 B2 | 5/2014 | Yen et al. | |
| 9,716,435 B2 * | 7/2017 | Radhakrishnan | H02M 1/00 |
| 9,837,898 B2 * | 12/2017 | Deng | H02M 1/083 |
| 2006/0044843 A1 * | 3/2006 | Oswald | G01R 19/0092 363/19 |
| 2007/0103005 A1 * | 5/2007 | Nagasawa | H02M 3/156 307/125 |
| 2008/0174286 A1 * | 7/2008 | Chu | H02M 3/1588 323/271 |
| 2011/0031934 A1 * | 2/2011 | Pagano | H02M 1/15 320/145 |
| 2011/0062929 A1 * | 3/2011 | Strydom | H02M 3/158 323/284 |
| 2012/0146599 A1 | 6/2012 | Oyama | |
| 2012/0161728 A1 * | 6/2012 | Chen | H02M 3/1563 323/271 |
| 2012/0319662 A1 * | 12/2012 | Kung | H02M 3/1588 323/271 |
| 2013/0063102 A1 * | 3/2013 | Chen | H02M 3/156 323/234 |

(Continued)

*Primary Examiner* — Yusef A Ahmed

(57) ABSTRACT

Embodiments of voltage regulators and methods for operating a voltage regulator are described. In one embodiment, a voltage regulator includes a power stage configured to convert an input direct current (DC) voltage into an output DC voltage, a driver device configured to drive the power stage, a timer configured to generate a constant on-time signal, a ripple generation device configured to generate a ripple signal, a comparator configured to perform voltage comparison in response to the ripple signal to generate an input to the timer, and a controller configured to generate a drive signal for the driver device in response to an inductor peak current in the voltage regulator and the constant on-time signal. Other embodiments are also described.

13 Claims, 5 Drawing Sheets

(56) References Cited

U.S. PATENT DOCUMENTS

| | | | | |
|---|---|---|---|---|
| 2013/0063113 A1* | 3/2013 | Couleur | .............. | H02M 3/1588 |
| | | | | 323/282 |
| 2013/0169248 A1* | 7/2013 | Zhang | .................. | H02M 3/158 |
| | | | | 323/271 |
| 2013/0307511 A1* | 11/2013 | De Vries | ............. | H02M 3/1563 |
| | | | | 323/284 |
| 2014/0070781 A1* | 3/2014 | Yanagida | ................. | G05F 1/10 |
| | | | | 323/271 |
| 2014/0191737 A1* | 7/2014 | Nagasawa | ........... | H02M 3/1584 |
| | | | | 323/272 |
| 2014/0292299 A1* | 10/2014 | Yang | .................. | H02M 3/1588 |
| | | | | 323/288 |
| 2014/0354166 A1* | 12/2014 | Yu | ...................... | H05B 33/0818 |
| | | | | 315/201 |
| 2015/0171737 A1* | 6/2015 | Pagano | .................. | H02M 1/32 |
| | | | | 323/284 |
| 2015/0180338 A1* | 6/2015 | Choi | ................... | H02M 3/1563 |
| | | | | 323/271 |
| 2015/0263617 A1* | 9/2015 | Xue | ..................... | H02M 3/156 |
| | | | | 323/271 |
| 2015/0326102 A1* | 11/2015 | Radhakrishnan | ....... | H02M 1/00 |
| | | | | 323/271 |
| 2016/0072384 A1* | 3/2016 | Fan | ...................... | H02M 3/156 |
| | | | | 323/282 |
| 2016/0301303 A1* | 10/2016 | Bari | ..................... | H02M 3/156 |
| 2016/0336870 A1* | 11/2016 | Halim | ................. | H02M 1/4225 |
| 2017/0155319 A1* | 6/2017 | Deng | ................... | H02M 1/083 |
| 2017/0317587 A1* | 11/2017 | Zhang | ................. | H04W 76/28 |
| 2018/0048232 A1* | 2/2018 | Adell | ................. | H02M 3/1563 |

\* cited by examiner

VOLTAGE REGULATOR AND METHOD FOR OPERATING A VOLTAGE REGULATOR

BACKGROUND

A DC-DC converter converts a direct current (DC) power source from one voltage level to another. A DC-DC converter may be, for example, a Buck DC-DC converter in which the input voltage is higher than the output voltage, a Boost DC-DC converter in which the input voltage is lower than the output voltage, or a Buck-Boost DC-DC converter in which the input voltage is higher or lower than the output voltage.

In a voltage regulator, such as a Buck DC-DC converter, a Boost DC-DC converter, or a Buck-Boost DC-DC converter, when the input voltage and the output voltage of the voltage regulator are close to each other, an inductor peak current can be rather small, which causes degradation in the regulator conversion efficiency.

SUMMARY

Embodiments of voltage regulators and methods for operating a voltage regulator are described. In one embodiment, a voltage regulator includes a power stage configured to convert an input DC voltage into an output DC voltage, a driver device configured to drive the power stage, a timer configured to generate a constant on-time signal, a ripple generation device configured to generate a ripple signal, a comparator configured to perform voltage comparison in response to the ripple signal to generate an input to the timer, and a controller configured to generate a drive signal for the driver device in response to an inductor peak current in the voltage regulator and the constant on-time signal. Other embodiments are also described.

In one embodiment, the constant on-time signal has a constant on time.

In one embodiment, the controller includes a comparator configured to compare the inductor peak current to a current threshold.

In one embodiment, the controller includes an OR gate configured to perform an OR operation on a comparison result signal from the comparator and the constant on-time signal from the timer.

In one embodiment, the drive signal has a waveform that is identical to a waveform of the comparison result signal or a waveform of the constant on-time signal.

In one embodiment, the drive signal has a waveform that is identical to the waveform of the comparison result signal if a width of the comparison result signal is larger than a width of the constant on-time signal.

In one embodiment, the drive signal has a waveform that is identical to the waveform of the constant on-time signal if a width of the constant on-time signal is larger than a width of the comparison result signal.

In one embodiment, the controller includes a peak current sensor configured to sense the inductor peak current.

In one embodiment, the peak current sensor includes a plurality of transistor devices operably connected to the power stage, an amplifier operably connected to the transistor devices and to an inductor of the voltage regulator, and a resistor device operably connected to the transistor devices and to a comparator of the controller, wherein the comparator is configured to compare the inductor peak current to a current threshold.

In one embodiment, the voltage regulator further includes an inductor connected to the power stage and to the ripple generation device.

In one embodiment, the power stage includes a plurality of power field-effect transistors (FETs).

In one embodiment, the voltage regulator is a Buck voltage regulator.

In one embodiment, the voltage regulator is a Boost voltage regulator.

In one embodiment, a voltage regulator includes a power stage configured to convert an input direct current (DC) voltage into an output DC voltage, a driver device configured to drive the power stage, a timer configured to generate a constant on-time signal, a ripple generation device configured to generate a ripple signal, a comparator configured to perform voltage comparison in response to the ripple signal to generate an input to the timer, and a controller configured to operate the voltage regulator in a constant on-time operation mode or a peak current control operation mode in response to an inductor peak current in the voltage regulator and the constant on-time signal.

In one embodiment, the controller includes a peak current sensor configured to sense the inductor peak current, a comparator configured to compare the inductor peak current to a current threshold, and an OR gate configured to perform an OR operation on a comparison result signal from the comparator and the constant on-time signal from the timer.

In one embodiment, the controller is configured to generate a drive signal for the driver device, and the drive signal has a waveform that is identical to a waveform of the comparison result signal or a waveform of the constant on-time signal, depending upon a relationship between a width of the comparison result signal and a width of the constant on-time signal.

In one embodiment, a method for operating a voltage regulator involves generating a drive signal in response to an inductor peak current in the voltage regulator and a constant on-time signal from a timer of the voltage regulator and driving a power stage with the drive signal to convert an input direct current (DC) voltage into an output DC voltage.

In one embodiment, generating the drive signal in response to the inductor peak current in the voltage regulator and the constant on-time signal from the timer of the voltage regulator includes comparing the inductor peak current to a current threshold to generate a comparison result signal and performing an OR operation on the comparison result signal and the constant on-time signal.

In one embodiment, the drive signal has a waveform that is identical to the waveform of the comparison result signal if a width of the comparison result signal is larger than a width of the constant on-time signal.

In one embodiment, the drive signal has a waveform that is identical to the waveform of the constant on-time signal if a width of the constant on-time signal is larger than a width of the comparison result signal.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
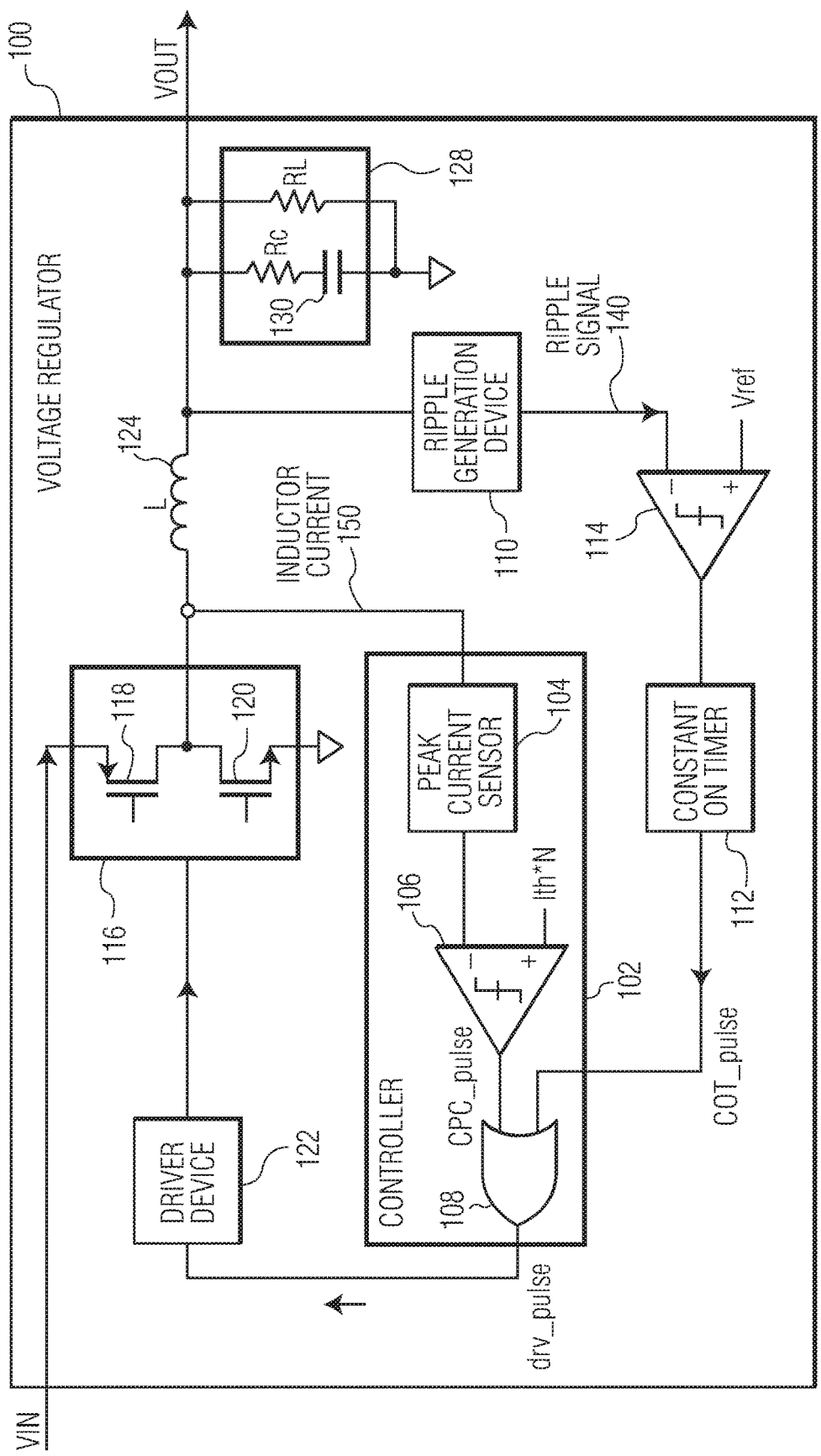
FIG. 1 is a schematic block diagram of a voltage regulator in accordance with an embodiment of the invention.

FIG. 1 is a schematic block diagram of a voltage regulator 100 in accordance with an embodiment of the invention. In the embodiment depicted in FIG. 1, the voltage regulator includes a controller 102, a ripple generation device 110, a constant on timer 112, a comparator 114, a power stage 116 that includes at least two power field-effect transistors (FETs) 118, 120, a driver device 122, an inductor 124 and an optional RC network 128. The ripple generation device, the comparator, and the constant on timer form a first feedback control loop from the output of the power stage after the inductor to the driver device while the controller form a second feedback control loop from the output of the power stage before the inductor to the driver device. The optional RC network 128 includes a capacitor 130 and resistors RC, RL. The RC network can be used as a load for the voltage regulator. In some embodiments, the RC network is not a component of the voltage regulator. The voltage regulator converts an input direct current (DC) voltage, VIN, into an output DC voltage, VOUT. The voltage regulator may be a Buck voltage regulator in which the input voltage, VIN, is higher than the output voltage, VOUT, a Boost voltage regulator in which the input voltage, VIN, is lower than the output voltage, VOUT, or a Buck-Boost voltage regulator in which the input voltage, VIN, is higher or lower than the output voltage, VOUT. Although the voltage regulator is shown in FIG. 1 as including certain components, in some embodiments, the voltage regulator includes less or more components to implement less or more functionalities. For example, in some embodiments, the voltage regulator includes a voltage summation device configured to sum up the voltage of the ripple signal that is generated by the ripple generation device with the output voltage, VOUT, of the voltage regulator.

In the embodiment depicted in FIG. 1, the power stage 116 and the inductor 124 are configured to convert the input voltage, VIN, into the output voltage, VOUT, using the at least two power FETs 118, 120. The at least two power FETs 118, 120 may be connected in series (stacked) or connected in parallel with each other.

In the embodiment depicted in FIG. 1, the driver device 122 is configured to drive the power stage 116. The driver device may be implemented with at least one analog circuit and/or at least digital circuit. The driver device is a common voltage regulator component, and consequently is not described in detail herein. In some embodiments, the driver device is implemented using a processor such as a microcontroller or a central processing unit (CPU).

In the embodiment depicted in FIG. 1, the constant on timer 112 is configured to generate a constant on-time signal, COT_pulse, which has a constant on time ((i.e., the time duration of an active portion of the waveform of the constant on-time signal, COT_pulse, being constant). For example, an active and inactive cycle is provided depending on the input voltage, VIN, and the output voltage, VOUT, such that a defined on time is generated. The constant on timer is a common voltage regulator component, and consequently is not described in detail herein. The constant on timer may be implemented by any type of on timer that can generate a timing signal having an active portion with fixed time duration. In some embodiments, the constant on timer is implemented using at least one processor such as a microcontroller or a CPU.

In the embodiment depicted in FIG. 1, the ripple generation device 110 is configured to generate a ripple signal 140. In some embodiments, the ripple signal is a voltage signal having a triangular waveform or other suitable waveform. In some embodiments, the ripple signal is added or subtracted from another signal, which may be a DC signal (e.g., the output voltage, VOUT, of the voltage regulator or another DC signal of the voltage regulator 100). The ripple generation device can be implemented in various techniques. In some embodiments, the ripple generation device includes at least one current source, at least one switch, and at least one capacitor. In these embodiments, the ripple generation device uses the current source to charge and discharge the capacitor to generate the ripple signal. In some other embodiments, the ripple generation device includes at least one amplifier, at least one resistor, at least one capacitor, and/or at least one resistor. In these embodiments, the ripple generation device generates the ripple signal based on inductor DC resistance (DCR) current sensing. The ripple generation device may be the same as or similar to ripple generation devices described in co-pending patent application, titled "RIPPLE GENERATION DEVICE AND METHOD FOR A CONSTANT ON-TIME VOLTAGE REGULATOR."

In the embodiment depicted in FIG. 1, the comparator 114 is configured to perform voltage comparison in response to the ripple signal 140 to generate an input to the constant on timer 112. For example, the comparator 114 is configured to compare the voltage of the ripple signal with a reference voltage, Vref, to generate an input to the constant on timer.

In the embodiment depicted in FIG. 1, the controller 102 is configured to generate a drive signal, drv_pulse, for the driver device 122 in response to an inductor peak current in the voltage regulator 100 and the constant on-time signal, COT_pulse. The driver device 122 is configured to drive the power stage based on the drive signal, drv_pulse, received from the controller.

In a typical constant on-time regulator, a built-in control loop controls the time duration in which one or more power FETs is turned on. However, a typical constant on-time regulator does not monitor and/or control the inductor peak current in each ON pulse. Consequently, when the input voltage and the output voltage in a typical constant on-time regulator are close or the inductance value in the constant on-time regular is large, the inductor peak current after each ON pulse finishes can be rather small, which causes degradation in the regulator conversion efficiency. For example, the inductor discharging rate can be extremely fast while a zero cross comparator needs some blanking time and settling time before it can output the zero cross detection signal. Consequently, the inductor current may already become negative before the zero cross comparator output flips. When the inductor current goes negative, it will discharge the energy at the output to the ground, which causes loss in the regulator conversion efficiency. In another example, there is switching loss each time when a power FET is turned on. In order to transfer the same amount of energy to the output, it takes more switching cycles when the inductor peak current is smaller. However, increasing the inductor peak current threshold can cause larger conduction root mean square (RMS) loss. In the embodiment depicted in FIG. 1, the controller 102 allows the voltage regulator 100 to operate in either a constant on-time operation mode or a peak current control operation mode to improve the regulator conversion efficiency in the condition when the input voltage, VIN, and the output voltage, VOUT are close to each other. In some embodiments, the peak current control operation mode is used when the input voltage, VIN, and the output voltage, VOUT, are close to each other, otherwise the constant on-time operation mode is used.

In an embodiment, the controller 102 includes a peak current sensor 104, a comparator 106 and an OR gate 108. The peak current sensor is configured to sense the inductor peak current (i.e., the peak value of inductor current 150) from the inductor 124. The comparator 106 is configured to compare the inductor peak current with a threshold current, Ith*N (where N is a positive integer or other suitable factor or coefficient), to generate a comparison result signal, CPC_pulse. The OR gate is configured to perform a logic operation on the signal, CPC_pulse, from the comparator 106 and the constant on-time signal, COT_pulse, from the constant on timer 112, to generate the drive signal, drv_pulse. The drive signal, drv_pulse, may have a waveform that is identical to the waveform of the comparison result signal, CPC_pulse, or the waveform of the constant on-time signal, COT_pulse. In an embodiment, the drive signal, drv_pulse, has a waveform that is identical to the waveform of the comparison result signal, CPC_pulse, if a width of the comparison result signal, CPC_pulse, is larger than a width of the constant on-time signal, COT_pulse. In an embodiment, the drive signal, drv_pulse, has a waveform that is identical to the waveform of the constant on-time signal, COT_pulse, if a width of the constant on-time signal, COT_pulse, is larger than a width of the comparison result signal, CPC_pulse. In some embodiments, the controller is configured to operate the voltage regulator in a constant on-time operation mode by allowing the constant on-time signal, COT_pulse, from the constant on timer 112 to be transmitted to the driver device 122 or to operate the voltage regulator in the constant peak current control operation mode by allowing the comparison result signal, CPC_pulse, from the comparator 106 to be transmitted to the driver device.

Figure 2:
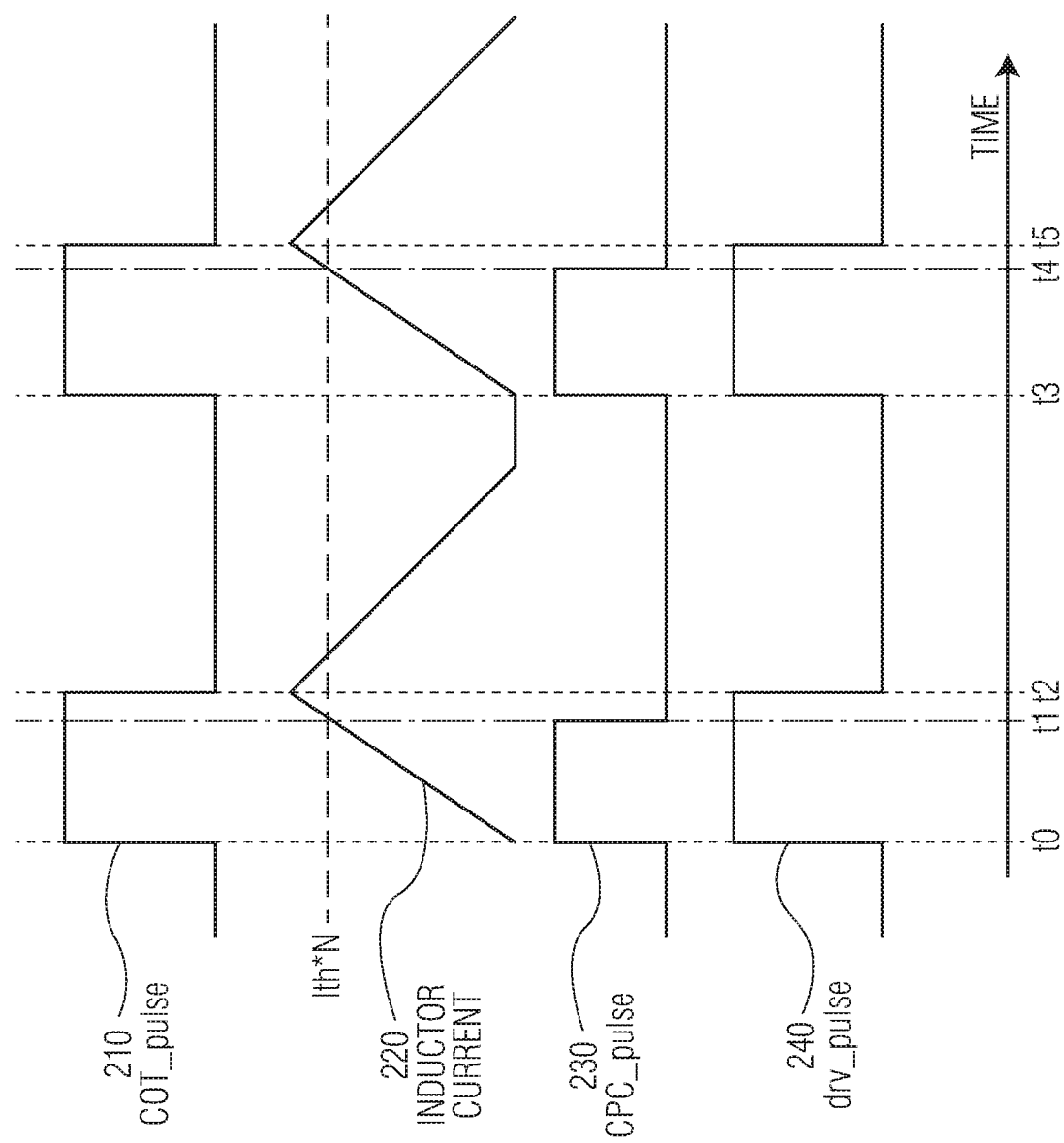
FIG. 2 is a signal timing diagram corresponding to the voltage regulator depicted in FIG. 1.

FIG. 2 is a signal timing diagram corresponding to the voltage regulator 100 depicted in FIG. 1. Signals illustrated in FIG. 2 include the constant on-time signal, COT_pulse, 210, the inductor current 220, the signal, CPC_pulse, 230 and the drive signal, drv_pulse, 240. In the timing diagram of FIG. 2, the inductor peak current (i.e., the peak value of the inductor current) is larger than a current threshold, Ith*N. For example, when the voltage difference of the input voltage, VIN, and the output voltage, VOUT, is large, the inductor peak current can be larger than the current threshold, Ith*N. Consequently, the pulse width of the constant on-time signal, COT_pulse, is larger than the pulse width of the signal, CPC_pulse, and the drive signal, drv_pulse, has an identical waveform as the constant on-time signal, COT_pulse. Specifically, at time point, t0, on rising edges of the constant on-time signal, COT_pulse, the signal, CPC_pulse, and the drive signal, drv_pulse, the inductor current begins to increase. At time point, t1, on a falling edge of the signal, CPC_pulse, the inductor current reaches the current threshold, Ith*N. Because the constant on-time signal, COT_pulse, is still at logic high at time point, t1, the drive signal, drv_pulse, is also at logic high. At time point, t2, the inductor current reaches its peak and the drive signal, drv_pulse, goes logic low right after the constant on-time signal, COT_pulse, expires (going from logic high to logic low). Similarly, at time point, t4, on rising edges of the constant on-time signal, COT_pulse, the signal, CPC_pulse, and the drive signal, drv_pulse, the inductor current begins to increase. At time point, t4, on a falling edge of the signal, CPC_pulse, the inductor current reaches larger than the current threshold, Ith*N. At time point, t5, the inductor current reaches its peak and the drive signal, drv_pulse, goes logic low right after the constant on-time signal, COT_pulse, expires.

Figure 3:
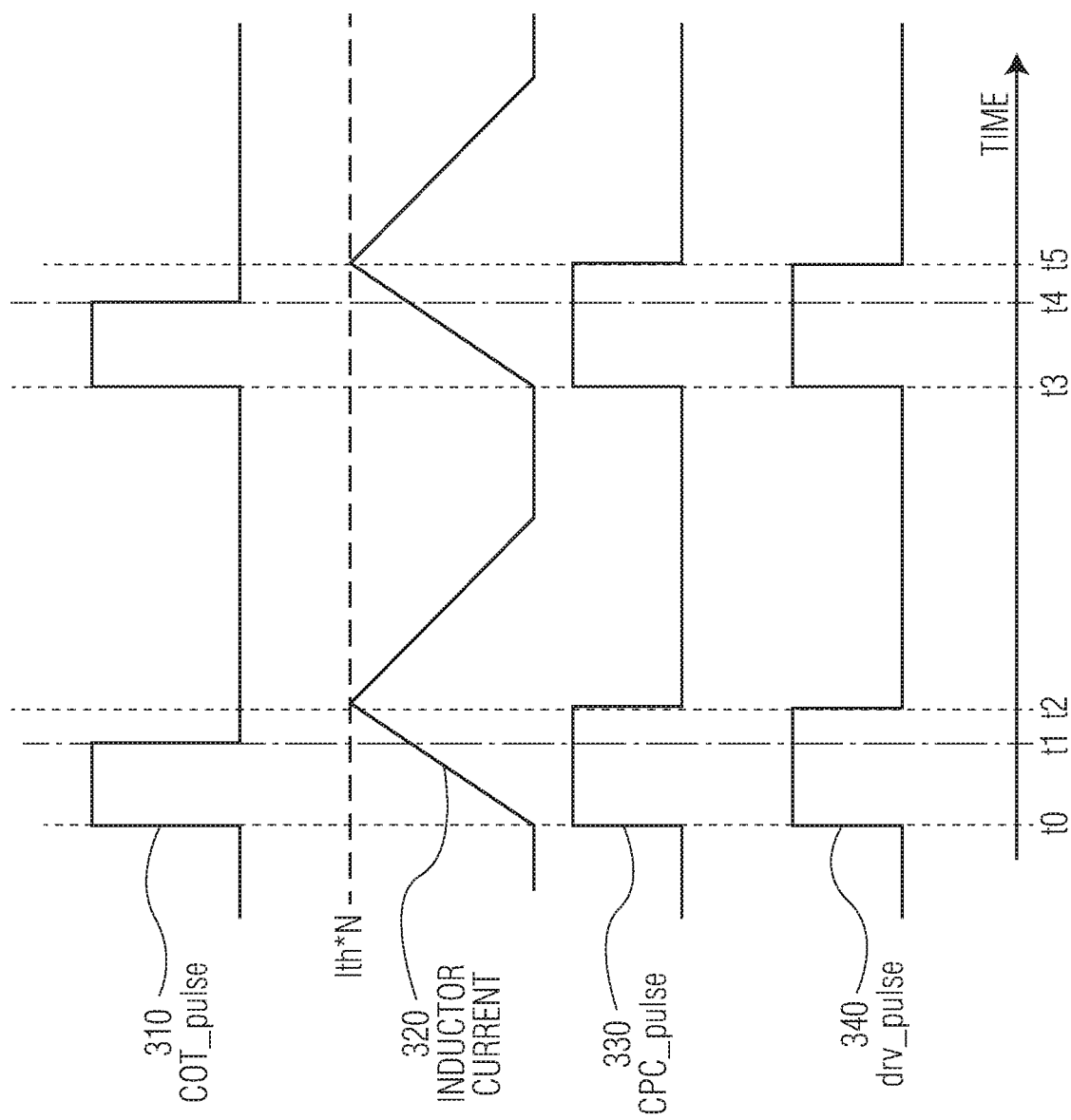
FIG. 3 is another signal timing diagram corresponding to the voltage regulator depicted in FIG. 1.

FIG. 3 is another signal timing diagram corresponding to the voltage regulator 100 depicted in FIG. 1. Signals illustrated in FIG. 3 include the constant on-time signal, COT_pulse, 310, the inductor current 320, the signal, CPC_pulse, 330 and the drive signal, drv_pulse, 340. In the timing diagram of FIG. 3, the inductor peak current is equal to the current threshold, Ith*N. For example, when the voltage difference of the input voltage, VIN, and the output voltage, VOUT, is small, the inductor peak current can be equal to the current threshold, Ith*N. Consequently, the pulse width of the constant on-time signal, COT_pulse, is smaller than the pulse width of the signal, CPC_pulse, and the drive signal, drv_pulse, has an identical waveform as the signal, CPC_pulse. Specifically, at time point, t0, on rising edges of the constant on-time signal, COT_pulse, the signal, CPC_pulse, and the drive signal, drv_pulse, the inductor current begins to increase. At time point, t1, on a falling edge of the constant on-time signal, COT_pulse, the inductor current continuously increases. Because the signal, CPC_pulse, is still at logic high at time point, t1, the drive signal, drv_pulse, is also at logic high. At time point, t2, the inductor current reaches Ith*N and the drive signal, drv_pulse, goes logic low right after the signal, CPC_pulse, expires (going from logic high to logic low). Similarly, at time point, t3, on rising edges of the constant on-time signal, COT_pulse, the signal, CPC_pulse, and the drive signal, drv_pulse, the inductor current begins to increase. At time point, t4, on a falling edge of the constant on-time signal, COT_pulse, the inductor current continuously increases. Because the signal, CPC_pulse, is still at logic high at time point, t1, the drive signal, drv_pulse, is also at logic high. At time point, t5, the inductor current reaches Ith*N and the drive signal, drv_pulse, goes logic low right after the signal, CPC_pulse, expires.

Figure 4:
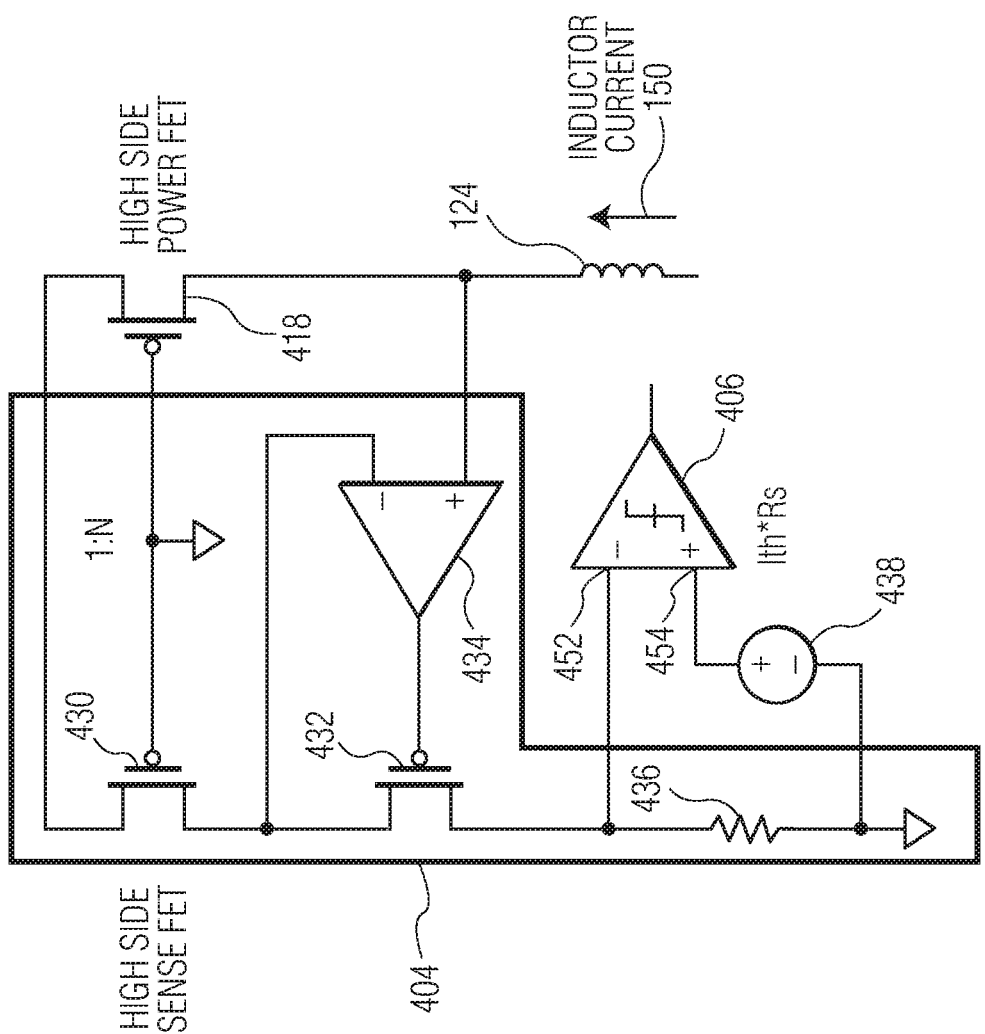
FIG. 4 depicts an embodiment of a peak current sensor of a controller of the voltage regulator of FIG. 1.

FIG. 4 depicts an embodiment of the peak current sensor 104 of the controller 102 of FIG. 1. In the embodiment depicted in FIG. 4, a peak current sensor 404 includes a high-side sense FET 430, a low-side sense FET 432, an amplifier 434, and a resistor 436 that is coupled to a voltage source 438 with a voltage level, Ith*Rs. The high-side sense FET is connected to a high-side power FET 418 of the power stage 116, which may be an embodiment of the power FET 118, and to an input of the amplifier. The other input of the amplifier is connected to the inductor 124. The output of the amplifier is connected to the low-side sense FET 432. The resistor 436 and the voltages source 438 are connected to an inverting node/terminal 452 and a non-inverting node/terminal 454 of a comparator 406, respectively. The comparator 406 is an embodiment of the comparator 106 depicted in FIG. 1. The peak current sensor 404 depicted in FIG. 4 is one possible embodiment of the peak current sensor 104 depicted in FIG. 1. However, the peak current sensor depicted in FIG. 1 is not limited to the embodiment shown in FIG. 4.

In an exemplary operation of the peak current sensor 404, the amplifier 434 allows the drain voltages between the high-side power FET 418 and the high-side sense FET 430 to be identical with each other. Because the high-side power FET 418 and high-side sense FET 430 have the same gate-to-source voltage and the same source-to-drain voltage, the current that is sensed by the high-side sense FET 430 is the inductor current 150 divided by N (where N is a positive integer or other suitable factor or coefficient). The voltage at the inverting node 452 of the comparator 406 can be represented as:

$$I_{ind}/N*Rs,$$

where $I_{ind}$ represents the inductor current 150 and Rs represents the resistance of the resistor 436. The voltage at the non-inverting node 454 of the comparator 406 can be represented as:

$$Ith*Rs.$$

Consequently, the output of the comparator 406 changes when the inductor peak current is equal to Ith*N, and the duty cycle/pulse width of the comparison result signal, CPC_pulse, is determined by the inductor current 150.

Figure 5:
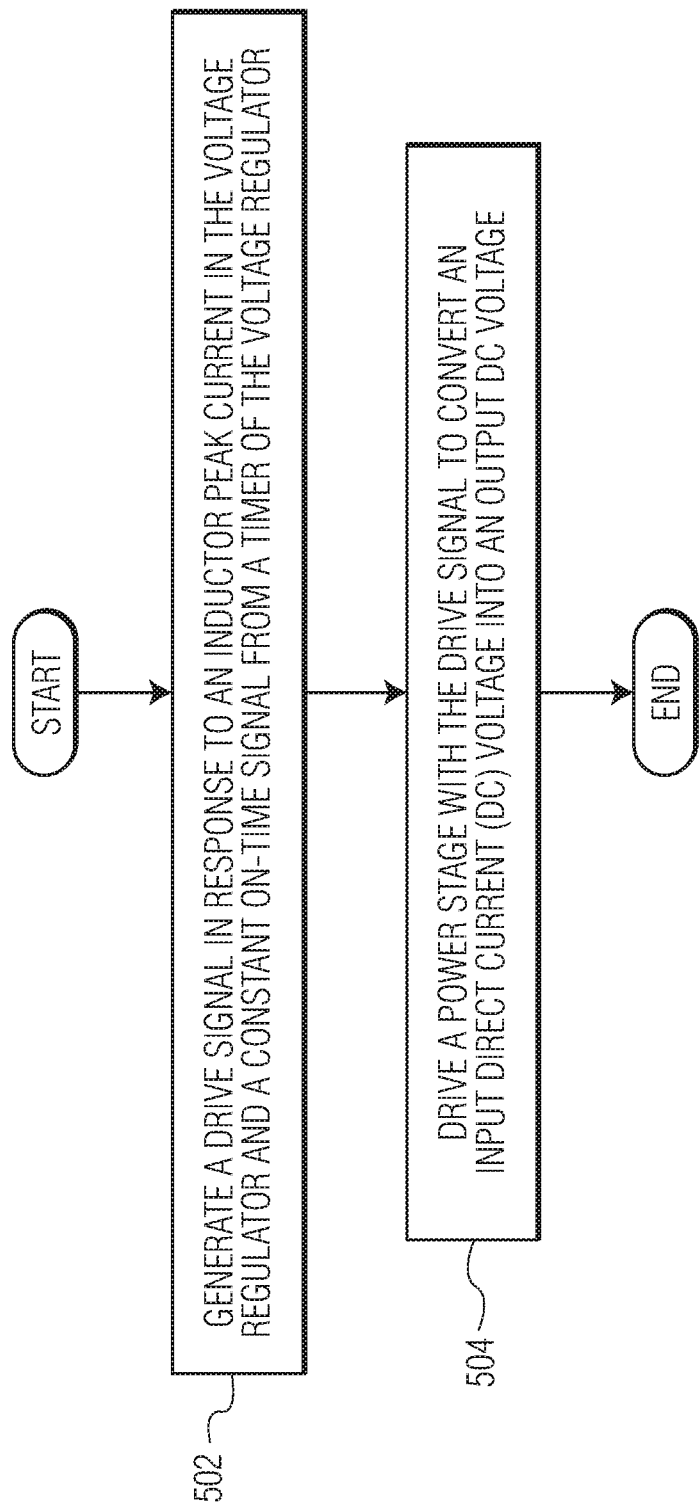
FIG. 5 is a process flow diagram of a method for operating a voltage regulator in accordance with an embodiment of the invention.

FIG. 5 is a process flow diagram of a method for operating a voltage regulator in accordance with an embodiment of the invention. At block 502, a drive signal is generated in response to an inductor peak current in the voltage regulator and a constant on-time signal from a timer of the voltage regulator. At block 504, a power stage is driven with the drive signal to convert an input direct current (DC) voltage into an output DC voltage. The voltage regulator may be similar to or the same as the voltage regulator 100 depicted in FIG. 1. The power stage may be similar to or the same as the power stage 116 depicted in FIG. 1.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A voltage regulator, the voltage regulator comprises:
a power stage configured to convert an input direct current (DC) voltage into an output DC voltage;
a driver device configured to drive the power stage;
a timer configured to generate a constant on-time signal;
a ripple generation device configured to generate a ripple signal;
a comparator configured to perform voltage comparison in response to the ripple signal to generate an input to the timer; and
a controller configured to generate a drive signal for the driver device in response to an inductor peak current in the voltage regulator and the constant on-time signal, wherein the controller comprises:
a peak current sensor configured to sense the inductor peak current;
a second comparator configured to compare the inductor peak current to a current threshold; and
an OR gate configured to perform an OR operation on a comparison result signal from the second comparator and the constant on-time signal that has a constant on time from the timer,
wherein the peak current sensor and the ripple generation device are connected to different terminals of an inductor of the voltage regulator.

2. The voltage regulator of claim 1, wherein the drive signal has a waveform that is identical to a waveform of the comparison result signal or a waveform of the constant on-time signal.

3. The voltage regulator of claim 2, wherein the drive signal has a waveform that is identical to the waveform of the comparison result signal if a width of the comparison result signal is larger than a width of the constant on-time signal.

4. The voltage regulator of claim 2, wherein the drive signal has a waveform that is identical to the waveform of the constant on-time signal if a width of the constant on-time signal is larger than a width of the comparison result signal.

5. The voltage regulator of claim 1, wherein the peak current sensor comprises:
 a plurality of transistor devices operably connected to the power stage;
 an amplifier operably connected to the transistor devices and to the inductor of the voltage regulator; and
 a resistor device operably connected to the transistor devices and to the second comparator of the controller, wherein the second comparator is configured to compare the inductor peak current to the current threshold.

6. The voltage regulator of claim 1, wherein the power stage comprises a plurality of power field-effect transistors (FETs).

7. The voltage regulator of claim 1, wherein the voltage regulator is a Buck voltage regulator.

8. The voltage regulator of claim 1, wherein the voltage regulator is a Boost voltage regulator.

9. A voltage regulator, the voltage regulator comprises:
 a power stage configured to convert an input direct current (DC) voltage into an output DC voltage;
 a driver device configured to drive the power stage;
 a timer configured to generate a constant on-time signal;
 a ripple generation device configured to generate a ripple signal;
 a comparator configured to perform voltage comparison in response to the ripple signal to generate an input to the timer; and
 a controller configured to operate the voltage regulator in a constant on-time operation mode or a peak current control operation mode in response to an inductor peak current in the voltage regulator and the constant on-time signal, wherein the controller comprises:
  a peak current sensor configured to sense the inductor peak current;
  a second comparator configured to compare the inductor peak current to a current threshold; and
  an OR gate configured to perform an OR operation on a comparison result signal from the second comparator and the constant on-time signal that has a constant on time from the timer,
 wherein the peak current sensor and the ripple generation device are connected to different terminals of an inductor of the voltage regulator.

10. The voltage regulator of claim 9, wherein the controller is configured to generate a drive signal for the driver device, and wherein the drive signal has a waveform that is identical to a waveform of the comparison result signal or a waveform of the constant on-time signal, depending upon a relationship between a width of the comparison result signal and a width of the constant on-time signal.

11. A method for operating a voltage regulator, the method comprising:
 generating a drive signal in response to an inductor peak current in the voltage regulator and a constant on-time signal from a timer of the voltage regulator; and
 driving a power stage with the drive signal to convert an input direct current (DC) voltage into an output DC voltage,
 wherein generating the drive signal in response to the inductor peak current in the voltage regulator and the constant on-time signal from the timer of the voltage regulator comprises:
  sensing the inductor peak current;
  comparing the inductor peak current to a current threshold to generate a comparison result signal; and
  performing an OR operation on the comparison result signal and the constant on-time signal that has a constant on time,
 wherein the voltage regulator includes a peak current sensor and a ripple generation device that are connected to different terminals of an inductor of the voltage regulator.

12. The method of claim 11, wherein the drive signal has a waveform that is identical to the waveform of the comparison result signal if a width of the comparison result signal is larger than a width of the constant on-time signal.

13. The method of claim 11, wherein the drive signal has a waveform that is identical to the waveform of the constant on-time signal if a width of the constant on-time signal is larger than a width of the comparison result signal.

* * * * *